United States Patent
Chen et al.

(10) Patent No.: US 12,014,481 B2
(45) Date of Patent: Jun. 18, 2024

(54) ELECTROMAGNETIC SUSCEPTIBILITY TESTING METHOD BASED ON COMPUTER-VISION

(71) Applicants: Inventec (Pudong) Technology Corporation, Shanghai (CN); INVENTEC CORPORATION, Taipei (TW)

(72) Inventors: Trista Pei-Chun Chen, Taipei (TW); Hao Hsuan Lee, Taipei (TW); Li Te Ko, Taipei (TW); Ming-Feng Lee, Taipei (TW); Chih Chang Chen, Taipei (TW); Hsin-Hung Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 323 days.

(21) Appl. No.: 17/548,701

(22) Filed: Dec. 13, 2021

(65) Prior Publication Data
US 2023/0085231 A1    Mar. 16, 2023

(30) Foreign Application Priority Data
Sep. 15, 2021   (CN) .......................... 202111078644.9

(51) Int. Cl.
*G06T 7/00*       (2017.01)
*G06V 10/25*      (2022.01)
(Continued)

(52) U.S. Cl.
CPC ............ *G06T 7/0004* (2013.01); *G06V 10/25* (2022.01); *G06V 10/40* (2022.01); *G06V 10/761* (2022.01);
(Continued)

(58) Field of Classification Search
CPC ......... G06T 7/0004; G06T 2207/20081; G06T 2207/20084; G06T 2207/20224;
(Continued)

(56) References Cited

U.S. PATENT DOCUMENTS

| 5,656,872 | A | * | 8/1997 | Lee ........................ H04B 15/00 |
| | | | | 333/167 |
| 6,020,939 | A | * | 2/2000 | Rindal ..................... H04N 5/21 |
| | | | | 348/820 |

(Continued)

*Primary Examiner* — Aaron W Carter
(74) *Attorney, Agent, or Firm* — Locke Lord LLP; Tim Tingkang Xia, Esq.

(57) ABSTRACT

The present disclosure proposes an electromagnetic susceptibility (EMS) testing method based on computer-vision. The method includes a training stage and a testing stage. During the training stage, the electronic device receives a testing data and the monitor displays a first picture. A camera captures the first picture to generate a template video. The processor generates a plurality of template images at least according to the template video. During the testing stage, an antenna emits an interference signal to the electronic device. The electronic device receives the testing data and the monitor displays a second picture. The camera captures the second picture to generate a testing video. The processor generates a testing image according to the testing video and calculates a difference ratio between the testing image and each template image. The processor sends an alert signal when the difference ratio is greater than a threshold.

9 Claims, 4 Drawing Sheets

(51) Int. Cl.
*G06V 10/40* (2022.01)
*G06V 10/74* (2022.01)

(52) U.S. Cl.
CPC ............... *G06T 2207/20081* (2013.01); *G06T 2207/20084* (2013.01)

(58) Field of Classification Search
CPC .......... G06T 2207/30121; G06T 7/001; G06V 10/25; G06V 10/40; G06V 10/761; G06V 10/82; G06V 10/993
See application file for complete search history.

(56) References Cited

U.S. PATENT DOCUMENTS

| | | | | |
|---|---|---|---|---|
| 6,608,586 | B1* | 8/2003 | Doerry | G01S 13/90 |
| | | | | 342/25 R |
| 11,144,201 | B2* | 10/2021 | Cui | G06F 3/04886 |
| 11,341,682 | B2* | 5/2022 | St. John | G06F 18/217 |
| 2008/0088336 | A1* | 4/2008 | Pommerenke | G01R 31/002 |
| | | | | 324/754.21 |
| 2009/0290686 | A1* | 11/2009 | Liu | H04N 25/617 |
| | | | | 378/162 |
| 2011/0139993 | A1* | 6/2011 | Liu | H04N 25/617 |
| | | | | 250/370.09 |
| 2012/0275569 | A1* | 11/2012 | Xue | A61B 6/54 |
| | | | | 378/91 |
| 2013/0193984 | A1* | 8/2013 | Kim | G01R 29/0814 |
| | | | | 324/613 |
| 2013/0286222 | A1* | 10/2013 | He | H04N 17/04 |
| | | | | 348/189 |
| 2014/0184219 | A1* | 7/2014 | Kim | G01R 33/48 |
| | | | | 324/309 |
| 2015/0260774 | A1* | 9/2015 | Choi | G01R 29/0814 |
| | | | | 324/613 |
| 2016/0301925 | A1* | 10/2016 | Li | H04N 17/004 |
| 2017/0200045 | A1* | 7/2017 | Cheswick | G06F 16/5854 |
| 2019/0018055 | A1* | 1/2019 | Li | G01R 31/001 |
| 2021/0145393 | A1* | 5/2021 | Gao | A61B 8/5269 |
| 2022/0051438 | A1* | 2/2022 | St. John | G06T 7/80 |
| 2023/0085231 | A1* | 3/2023 | Chen | G06V 10/761 |
| | | | | 382/141 |

* cited by examiner

ELECTROMAGNETIC SUSCEPTIBILITY TESTING METHOD BASED ON COMPUTER-VISION

CROSS-REFERENCE TO RELATED APPLICATIONS

This non-provisional application claims priority under 35 U.S.C. § 119(a) on Patent Application No(s). 202111078644.9 filed in China on Sep. 15, 2021, the entire contents of which are hereby incorporated by reference.

BACKGROUND

1. Technical Field

The present disclosure relates to electromagnetic susceptibility testing and image comparison, and more particular, to a computer vision-based electromagnetic susceptibility testing method.

2. Related Art

Electromagnetic Susceptibility (EMS) is the tolerability or immunity of the electronic device against the Electromagnetic Interference (EMI) or Radio Frequency Interference (RFI). If an electronic device with good EMS does not generate EMI or RFI to other devices, this electronic device is considered as having good Electromagnetic Compatibility (EMC). In other words, the goal of applying EMC is to ensure that different devices can operate correctly in a common electromagnetic environment.

The radiation field susceptibility testing for EMS typically involves in using a high-power RF or electromagnetic device as well as a radiation antenna, to direct the energy to an electronics under test (EUT), such as a laptop computer. The EUT is placed inside an anechoic RF chamber, and a monitor is used to display one of multiple types of testing data. While the antenna emits the electromagnetic waves, the camera records the monitor of the EUT, and the testing person outside the anechoic RF chamber observes whether the captured testing image has an anomaly, and manually records the applied electromagnetic wave frequency and setting parameters when there is an anomaly. The so-called anomalies may include black screen, screen flickering, and line distortions, etc.

However, the task of current EMS testing is labor-intensive and tiring to human eyes, thus causing the testing person to overlook some anomalies.

SUMMARY

According to an embodiment of the present disclosure, a computer vision-based electromagnetic susceptibility (EMS) testing method applicable to an electronic device having a monitor, wherein the testing method comprises: a training stage comprising: receiving a testing data by the electronic device, and displaying a first picture corresponding to the testing data by the monitor; capturing, by a camera, the first picture to generate a template video; and generating a plurality of template images at least according to the template video by a processor; and a testing stage comprising: after the plurality of template images are generated, emitting an interference signal to the electronic device by an antenna; receiving the testing data by the electronic device receiving the interference signal, and displaying a second picture corresponding to the testing data by the monitor; capturing, by the camera, the second picture to generate a testing video; generating a testing image according to the testing video by the processor; calculating, by the processor, a difference ratio of the testing image to each of the plurality of template images; and generating an alert signal by the processor when the difference ratio is greater than a threshold.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

The present disclosure provides a computer vision-based electromagnetic susceptibility (EMS) testing method applicable to an electronic under test (EUT) having a monitor, which is briefed as "electronic device" in following paragraphs.

Figure 1:
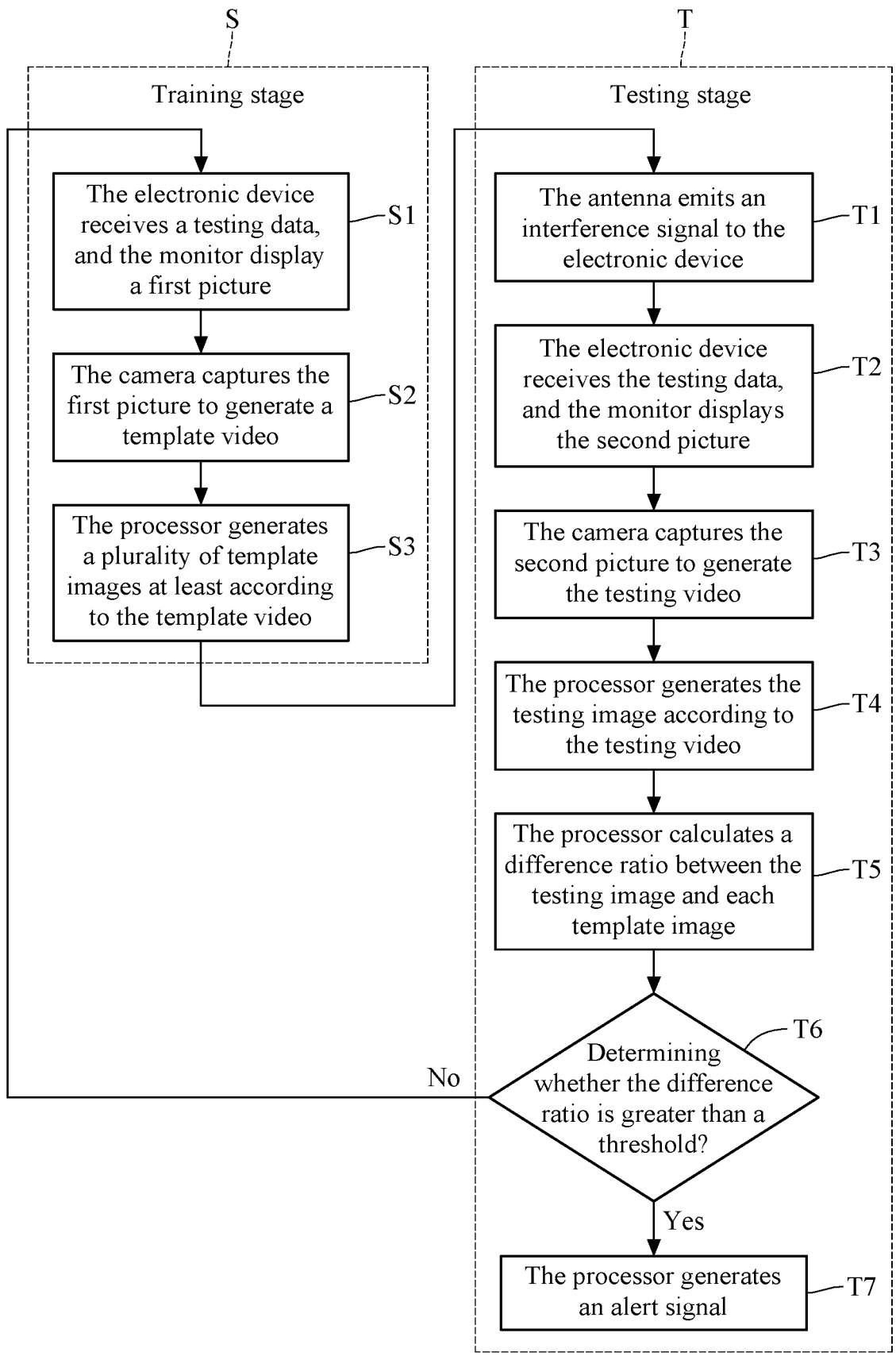
FIG. 1 is a flow chart of the computer vision-based EMS testing method according to an embodiment of the present disclosure.

FIG. 1 is a flow chart of the computer vision-based EMS testing method according to an embodiment of the present disclosure. This method comprises a training stage S and a testing stage T, wherein the training stage S comprises Steps S1-S3, and the testing stage T comprises Steps T1-T6. The implementation of each Step will be explained sequentially.

Step S1 represents "the electronic device receives a testing data, and the monitor displays a first picture". The first picture corresponds to the testing data, and the type of the testing data comprises: static testing diagram, semi-static testing diagram, and dynamic testing diagram. The static testing diagram is an image, wherein the color of each pixel remains unchanged. The dynamic testing diagram is a video, wherein the color of each pixel in a frame is time-variant. The semi-static testing diagram is equivalent to an integration of the static testing diagram and the dynamic testing diagram. In other words, all pixels in the image are separated into two parts, wherein the color of each pixel in one part remains unchanged, and the color of each pixel in another part is time-variant.

Step S2 represents "the camera captures the first picture to generate a template video". The template video is generated by capturing the monitor.

Step S3 represents "the processor generates a plurality of template images at least according to the template video". Please refer to FIG. 2, which is a detailed flow chart of Step S3. Step S31 represents "setting a region of interest (ROI) in the template video", Step S32 represents "performing a calibration operation according to the region of interest" and Step S33 represents "performing an algorithm to generate the plurality of template images".

The processor sets a region of interest in the template video in Step S31. In practice, the image captured by the camera may include the environment around the monitor, such as the desktop where the electronic device is disposed and the wall behind the monitor. However, only the first picture of the template image is required in the subsequent process. Therefore, it is necessary to perform Step S31 to filter out the parts irrelevant to the first picture. Step S31 may be implemented in an automatic or manual method.

The method of automatically-setting ROIs is to extract the first picture from each frame of the template video according to the color (or brightness) of the environment where the electronic device is located and the adaptive thresholding algorithm. The adaptive thresholding algorithm may be, for example, the OTSU algorithm, K-means, or the adaptiveThreshold function of OpenCV. In addition, if there is no other light-emitting element in the RF anechoic chamber except the monitor, the color of the environment where the electronic device is located will be black, and thus it is easy to separate light-emitting areas from the template video as the template images.

The ROI manual-setting method uses another monitor to display the template video, and the user determines the range of the first picture according to the picture displayed by said other monitor.

In practice, the electronic device is disposed on a rotatable table. During the testing stage T, the electronic device can evenly receive the interference signal through the rotation. The camera is usually disposed at a fixed position, so that the shape and location of the monitor in the template video captured by the camera may change with the rotation angle. Therefore, in other embodiments, if the camera can rotate synchronously with the electronic device to make the lens always face the monitor, Step S31 can be skipped. For example, the processor first determines whether the template video contains parts other than the first picture, Step S31 can be skipped when the determination result is "no", while Step S31 is performed when the determination result is "yes".

In Step S32, the perspective transformation is an example of said calibration operation. For example, if the template video is displayed by another monitor, the user may find a visual difference from the first picture when watching the picture displayed on said other monitor, and this is caused by the internal parameters of the camera and the optical parameters of the lens. For example, if the camera adopts fisheye lens, the edge of the picture displayed on said other monitor may be found deformed or bent compared to the edge of the first picture. Hence, it is necessary to perform the calibration operation to restore the deformed ROI in the template video on the shape of the first picture, wherein the shape is generally rectangular, but the present disclosure is not limited thereto.

The processor may extract a plurality of frames from the template video according to a specified sampling frequency in Step S33, and then perform an algorithm according to these frames to determine a foreground attribute and a background attribute of each pixel in every frame. The pixel with the background attribute is used as a standard in the subsequent comparison, while the pixel with the foreground attribute is viewed as an anomaly pixel in most cases.

In the first embodiment of Step S33, the algorithm is Gaussian mixture model or ViBE.

In the second embodiment of Step S33, details of the algorithm are described below:

First, the processor performs a corresponding procedure to generate the template image according to the type of the testing data.

If the testing data is a dynamic testing diagram, the processor extracts at least one frame of the template image as the template image. However, the present disclosure does not limit the extraction number of frames or the extraction rule of frames. For example, the template video may include 30 frames F1-F30, and the processor may set all frames F1-F30 as template images. In another example, the processor may select F1-F10 as the template images. More template images may improve the comparison accuracy during the testing stage T.

If the testing data is a static testing diagram, the processor may perform a background initialization procedure according to the first frame of the template image, and perform a background updating procedure according to the second frame of the template image, wherein the second frame is one of a plurality of frames and all the timings of said the plurality of frames are later than the timing of the first frame. Please refer to FIG. 3, which is a flow chart of Step S33 when the testing data is the static testing diagram.

The background initialization procedure is shown as Step S331, "obtaining a plurality of reference pixels adjacent to the first central pixel". Each pixel of the first frame may be used as the first central pixel. For example, the frame size is 3×3, this frame has 9 pixels arranged in a form of jiugongge. If the pixel at the center position of the jiugongge is set as the first central pixel, and the reference pixel can be determined by selecting N pixels from the rest 8 pixels of the jiugongge, wherein N denotes the sampling depth of the reference pixel, and N≤8. Unless the position is at the edge of the frame, each first central pixel can have N reference pixels selected from the surrounding pixels, and these N reference pixels are used as standards for pixel comparison. The distance between the first central pixel and each of adjacent pixels can be adjusted according to the sampling depth N. For example, the selection range of the reference pixel expands to a 5×5 region when the sampling depth N is 20, and this region is the area formed by extending the distance of two pixels around the first central pixel as the center.

The background updating procedure is shown as Steps S332, S333, and S334. Step S332 represents "determining a similarity of a second central pixel and each reference pixel", Step S333 represents "determining an attribute of the second central pixel according to the similarity", and Step S334 represents "replacing the first central pixel or the reference pixel with the second central pixel according to the specified probability, the attribute, and a continuous-frame quantity".

The second central pixel may be each pixel of the second frame in Steps S332, S333. When the pixel number of reference pixels among the N reference pixels (of the first frame) that are similar to the second central pixel is smaller than a lower bound m, the processor sets the foreground attribute of the second central pixel. On the other hand, when the pixel number of reference pixels among the N reference pixels (of the first frame) that are similar to the second central pixel is not smaller than the lower bound m, the processor sets the background attribute of the second central pixel. In an embodiment, the condition for determining two pixels to be similar is that the Euclidean distance between the two pixels is shorter than a default value. In another embodiment, the condition for determining two pixels to be similar is that the pixel intensity difference between the two pixels is smaller than a default value.

When the background attribute of the second central pixel is set in Step S334, the first central pixel or the reference pixel is replaced with the second central pixel according to the specified probability r.

In Step S334, if in C consecutive frames of the template video, the second central pixels at the same location all have the foreground attribute, the processor replaces the first central pixel of the first frame with the second central pixel. Taking a scenario as an example, during the training stage S, the user accidentally moves the mouse cursor from the upper left corner to the lower right corner of the screen at a certain timing, and then stays in the lower right corner. In this scenario, foreground attributes of the multiple pixels forming the cursor will be set at the beginning of training stage S, because the mouse cursor is not a part of the testing data. However, since these pixels still exist in consecutive frames, they will be recognized as a part of the template image.

In an embodiment, multiple parameters are set based on the consideration of computing speed and accuracy, wherein the sampling depth of the reference pixel N is 5, lower bound m is 2, specified probability r is $\frac{1}{16}$, and continuous-frame quantity C is 15.

If the testing data is the semi-static testing diagram, the testing data may be separated to a dynamic part and a static part. Regarding these two parts, please refer to the aforementioned methods for dynamic testing diagram and static testing diagram and perform adaptive adjustment to generate template image.

Figure 3:
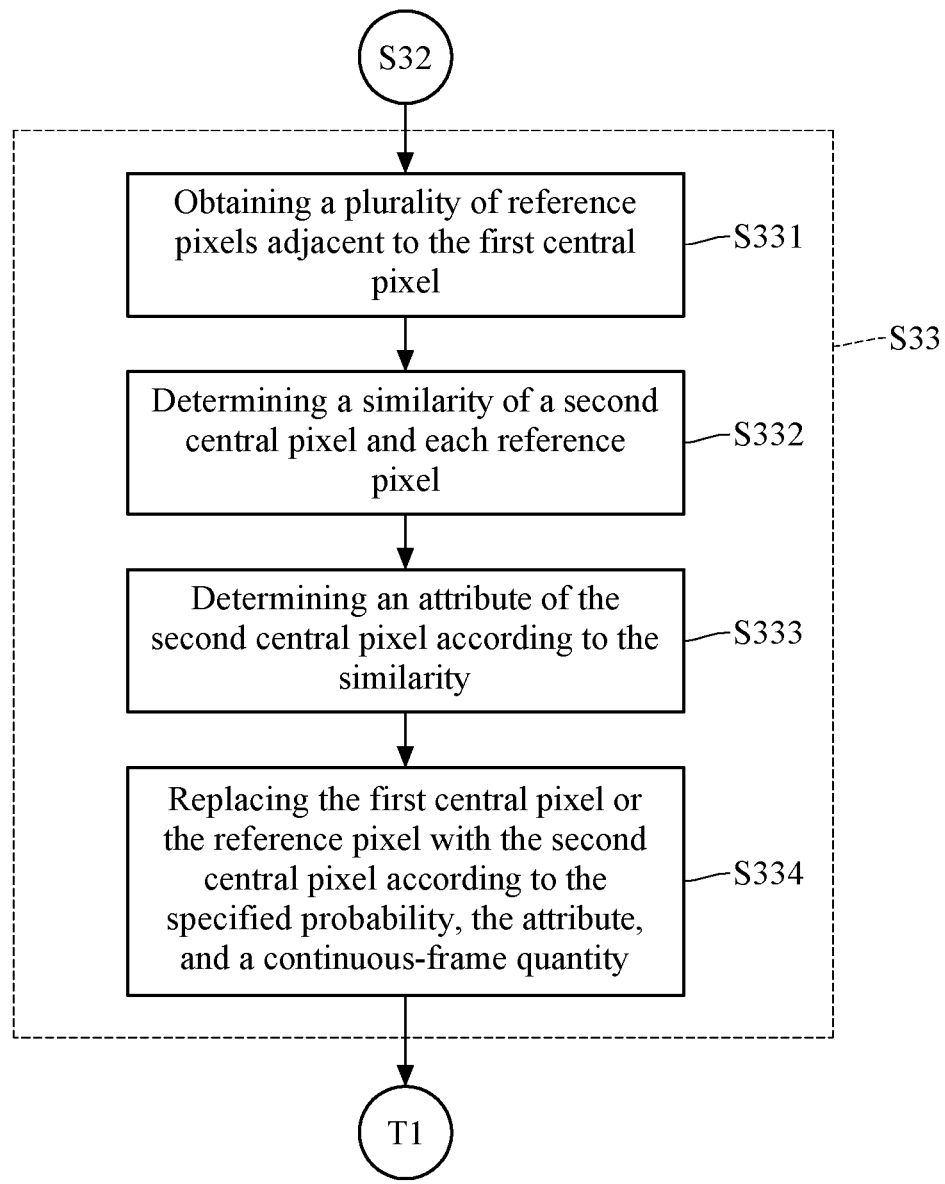
FIG. 3 is a detailed flow chart of a step in FIG. 2.

During the training stage S, the processor keeps updating a background model according to a new second frame of the template video and the process shown in FIG. 3. The background model is composed of a basic template image and a reference pixel dictionary. The basic template image is composed of multiple first central pixels, and is equivalent to an updated first frame. The reference pixel dictionary records multiple reference pixels corresponding to each pixel of the basic template image. In another perspective, the background model is composed of multiple template images, wherein each pixel position of each template image is one of the first central pixel and multiple reference pixels.

After finishing the training stage S, the processor has already generated one or more template images and record them to a storage device so that these template images can be loaded as a norm in the testing stage T.

In the embodiment described above, the processor directly uses the first frame of the template video as an initial template image, and then updates the template image according to the second frame of the template video. In another embodiment, the processor may use the testing data as an initial template image, and then update the template image according to the template video. According to said other embodiment, the number of frames used in the training stage S can be reduced with the maintained comparison accuracy, thereby reducing the computing cost during training.

The testing stage T comprises Steps T1-T6, wherein Step T1 represents "The antenna emits an interference signal to the electronic device".

Step T2 represents "The electronic device receives the testing data, and the monitor displays the second picture". The second picture corresponds to the testing data. The testing data used in Step T2 and Step S1 are of the same type.

Step T3 represents "The camera captures the second picture to generate the testing video". Steps T2, T3 are similar to Steps S1, S2 while the difference is described below. The electronic device is affected by the interference signal during the testing stage T, and thus the second picture may have anomaly such as black screen, screen flickering, or line distortions; while the electronic device is not affected by the interference signal during the training stage S, so a template of a normal picture can be summarized.

Figure 2:
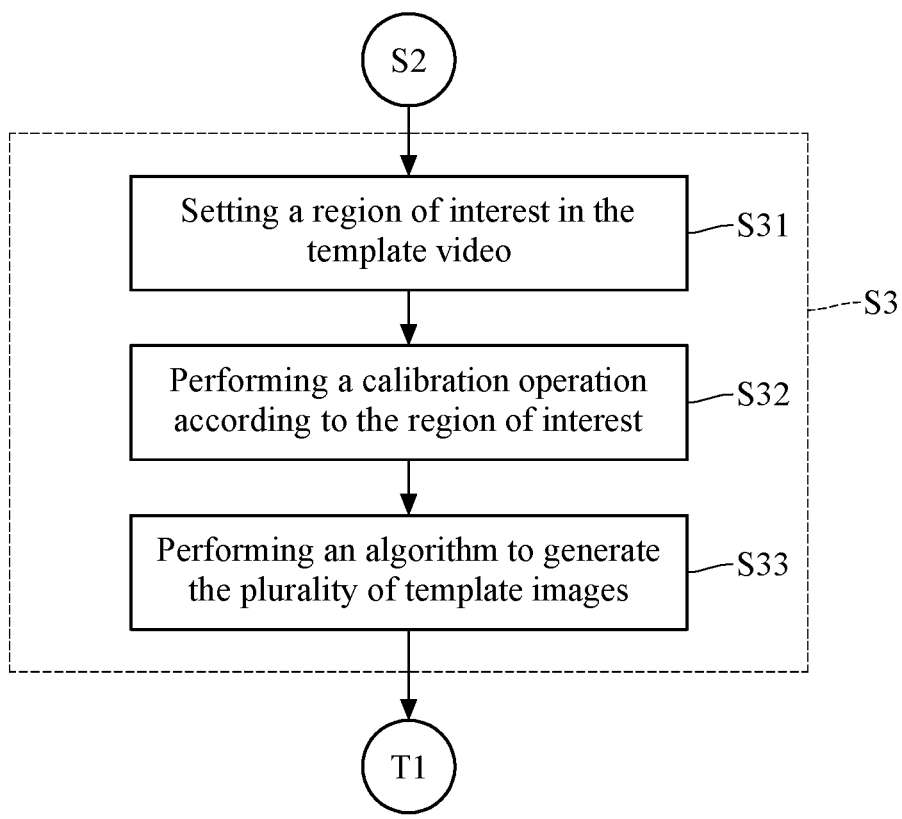
FIG. 2 is a detailed flow chart of a step in FIG. 1.

Step T4 represents "the processor generates the testing image according to the testing video". Step T4 is similar to Step S3, while the difference is described below. The processor generates a testing image according to each frame of the testing video in Step T4. In an embodiment, if Step S3 includes the process of ROI setting and calibration as shown in FIG. 2, this process needs to be adaptively modified to adapt Step S4. In addition, if there is a requirement to speed up the execution of the testing stage T, the processor may generate multiple testing images by selecting a part of frames from all frames of the testing video in Step T4.

Step T5 represents "the processor calculates a difference ratio between the testing image and each template image". The processor performs a procedure corresponding to the type of the testing data to calculate the difference ratio. The difference ratio is calculated as Step T5 of FIG. 4 when the testing data is the dynamic testing diagram, while the difference ratio is calculated as Step T5' of FIG. 5 when the testing data is a static testing diagram.

When the testing data is the dynamic testing diagram, multiple template images will be generated after the training stage S, and the processor compares the feature similarity between each template image and the input image in the neural network based on perceptual similarity metric.

Figure 4:
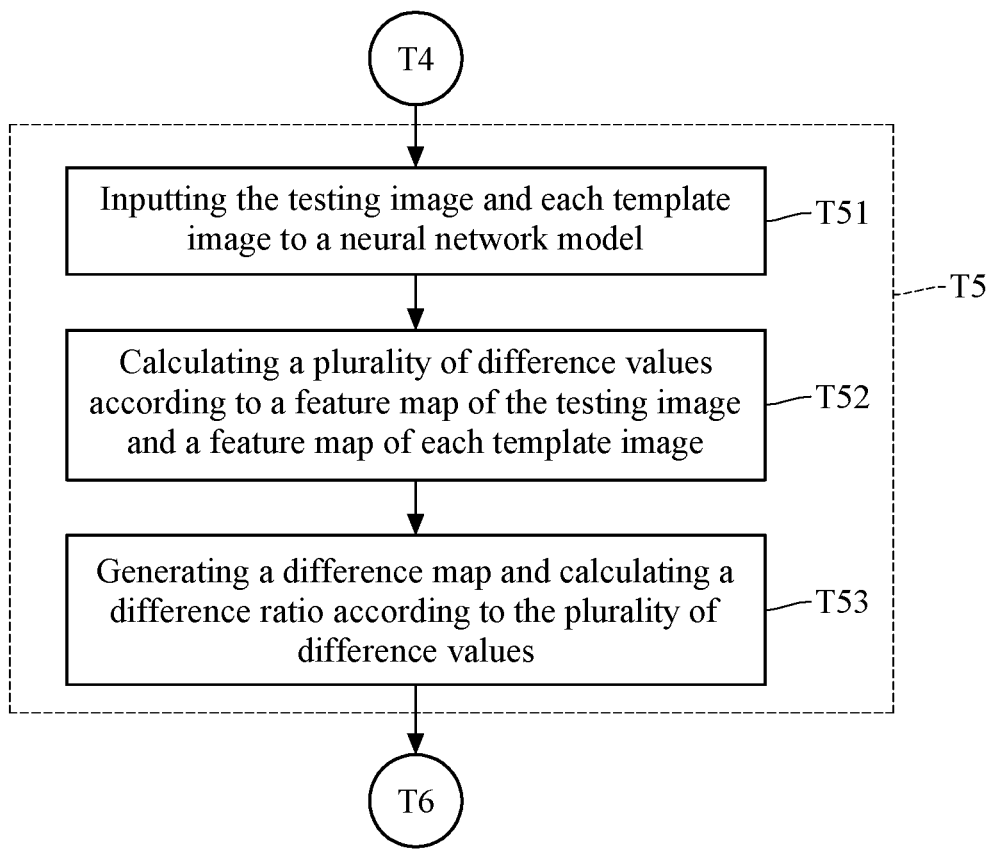
FIG. 4 is a detailed flow chart of a step in FIG. 1 according to an embodiment of the present disclosure.

Please refer to FIG. 4. Step T51 represents "inputting the testing image and each template image to a neural network model". The neural network has multiple layers of convolution operations. For example, the neural network model is AlexNet, which is configured to calculate a perceptual similarity between two images. The operation of resizing the testing image to the size of the template image can also be performed in Step T51.

Step T52 represents "calculating a plurality of difference values according to a feature map of the testing image and a feature map of each template image". The feature map of the testing image and the feature map of each template image are generated in the convolution operation of each layer. In an embodiment, the processor upsamples the feature map of the template image and the feature map of the testing image in the convolution operations of the first three layers. After these two feature maps are resized into the same size, the processor calculates the difference value of these two feature maps. The calculation method is as follows. Regarding two pixels locates at the same position L respectively in two feature maps, the processor calculates the Euclidean distance D between said two pixels as the difference value of position L in the difference map. The shorter the Euclidean distance D is, the more similar these two pixels will be; and the longer the Euclidean distance D is, the more dissimilar these two pixels will be. In an embodiment, the Euclidean distance D between the two pixels are calculated in their RGB values respectively, therefore the difference value is a three-dimensional data.

Step T53 represents "generating a difference map and calculating a difference ratio according to the plurality of difference values". In the difference map, if the Euclidean distance D of the pixel at the position L is greater than a default value, the processor labels "difference pixel" at the position L in the difference map. The difference ratio is associated with a quantity of all difference pixels in the difference map and a total pixel quantity of the difference map, wherein the difference value of each difference pixel is greater than the default value. In an embodiment, the processor calculates an area of the block composed of all difference pixels, and the difference ratio is the ratio of this area to the total area of the difference map.

Each template image and the testing image are used to generated a difference map and a difference ratio after the process of Steps T51-T5. In an embodiment, the processor may select the maximum of these difference ratios as a standard for determining whether the testing image passes the test. In another embodiment, the processor calculates a weighted average of these difference ratios as the standard for determining whether the testing image passes the test, and the present disclosure does not limit thereto.

Figure 5:
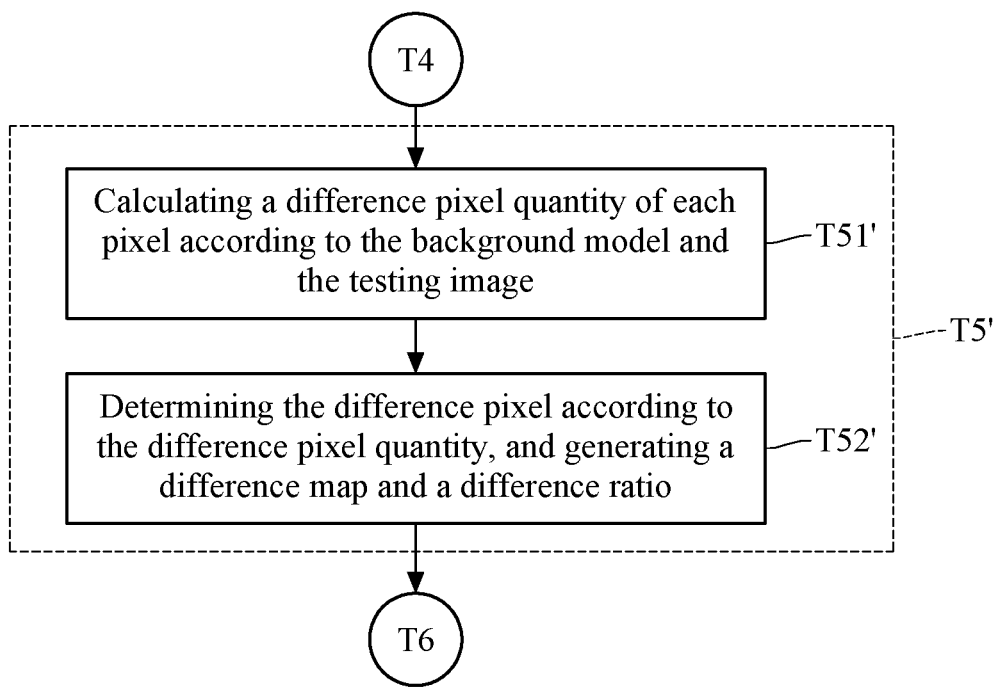
FIG. 5 is a detailed flow chart of a step in FIG. 1 according to another embodiment of the present disclosure.

When the testing data is the static testing diagram, the difference ratio is calculated as Step T5' of FIG. 5, Step T5' comprises Step T51' and Step T52'. The background model stops updating operation during the testing stage T.

Step T51' represents "calculating a difference quantity of each pixel according to the background model and the testing image". Specifically, regarding the pixel $P_T$ at the position L of the testing image, and the pixel $P_M$ corresponding to the position L in the background model, the processor calculated how many $P_M$ is similar to the pixel $P_T$. The processor may calculate the difference quantity according to the quantity of similar pixels and the quantity of pixel $P_M$, wherein pixel $P_M$ includes the first central pixel and correspond reference pixels thereof.

Step T52' represents "determining the difference pixel according to the difference quantity, and generating a difference map and a difference ratio".

In an embodiment, regarding each pixel of the testing image, this pixel will be labeled as "difference pixel" in the difference map if the difference quantity of this pixel is greater than a tolerable value; otherwise, this pixel will not be labeled as "difference pixel". The difference ratio is the ratio of the difference pixel in the difference map to all the pixels in the difference map.

Please refer to FIG. 1. Step T6 represents "determining whether the difference ratio is greater than a threshold".

Step T7 will be performed if the determination result is "yes". Step S1 will be performed if the determination result is "no", and the processor may select another type of testing data for the next EMS test before performing Step S1.

The processor generates an alert signal in Step S7. In addition, the processor records data such as an anomaly type, a frequency of the interference signal, the type of testing data, the electronic device's configuration, and the current threshold, to the database of the storage device.

In an embodiment, a step for dynamically adjusting the threshold is further included before Step T6. Specifically, the processor reads the configuration of the electronic device, and searches the database for a historical testing record whose configuration is similar to this configuration. If the processor finds the historical testing record and a historical threshold thereof, the processor will adjust the threshold used in subsequent Step T6 according to the historical threshold.

The present disclosure provides a computer vision-based electromagnetic susceptibility testing method, which uses a computer vision-based EMC test monitoring system to continuously receive testing images captured by the camera in the anechoic RF chamber. The present disclosure can imitate the mechanism of image observation and determination performed by a human tester, and thereby determining whether there is an anomaly in the testing image, and automatically recording the configuration when the anomaly is detected In view of the above, the present disclosure proposes a computer vision-based electromagnetic susceptibility testing method. During the training stage, the processor dynamically updates the template image representing a normal picture from the video captured by the camera. During the testing stage, the processor extracts the testing image from the video captured by the camera and perform a comparison between the testing image and the template image and thereby automatically detecting any anomaly part of the picture displayed by the monitor. Moreover, the present disclosure can dynamically adjust the threshold configured for anomaly detection according to the past anomaly testing record.

What is claimed is:

1. A computer vision-based electromagnetic susceptibility (EMS) testing method applicable to an electronic device having a monitor, wherein the testing method comprises:
    a training stage comprising:
        receiving a testing data by the electronic device, and displaying a first picture corresponding to the testing data by the monitor;
        capturing, by a camera, the first picture to generate a template video; and
        generating a plurality of template images at least according to the template video by a processor; and
    a testing stage comprising:
        after the plurality of template images are generated, emitting an interference signal to the electronic device by an antenna;
        receiving the testing data by the electronic device receiving the interference signal, and displaying a second picture corresponding to the testing data by the monitor;
        capturing, by the camera, the second picture to generate a testing video;
        generating a testing image according to the testing video by the processor;
        calculating, by the processor, a difference ratio of the testing image to each of the plurality of template images; and
        generating an alert signal by the processor when the difference ratio is greater than a threshold,
    wherein generating the plurality of template images at least according to the template video by the processor comprises:
        determining a region of interest in the template video;
        perform a calibration operation according to the region of interest; and
        performing an algorithm to generate the plurality of template images.

2. The computer vision-based EMS testing method of claim 1, wherein the algorithm is Gaussian mixture model or ViBE.

3. The computer vision-based EMS testing method of claim 1, wherein the testing data is a dynamic testing diagram, and the algorithm comprises:
    extracting at least one frame from the template image by the processor to serve as the plurality of template images.

4. The computer vision-based EMS testing method of claim 1, wherein the testing data is a static testing diagram, and the algorithm comprises:
    a background initialization procedure comprising:

obtaining a plurality of reference pixels adjacent to a first central pixel, wherein the first central pixel is one of pixels of a first frame of the template image; and a background updating procedure comprising:

determining a similarity between a second central pixel and one of said plurality of reference pixels, wherein the second central pixel is one of pixels of a second frame of the template image, and a timing of the second frame is later than a timing of the first frame;

when a pixel number of reference pixels among said plurality of reference pixels which are similar to the second central pixel is smaller than a lower bound, setting a foreground attribute of the second central pixel; or otherwise setting a background attribute of the second central pixel;

when the second central pixel has the background attribute, replacing the first central pixel or one of said plurality of reference pixels with the second central pixel according to a specified probability; and when the second central pixel has the foreground attribute during consecutive frames of the template video, replacing the first central pixel with the second central pixel.

5. The computer vision-based EMS testing method of claim 1, wherein the testing image is a dynamic testing diagram, and calculating the difference ratio of the testing image to each of the plurality of template images by the processor comprises:

inputting the testing image and each of the plurality of template images to a neural network model, wherein the neural network model comprises a plurality of layers of convolution operations; and calculating a feature map of the testing image and a feature map of each of the plurality of template images in each of the plurality of layers of convolution operation;

upsampling the feature map of the testing image and the feature map of each of the plurality of template images in each of the plurality of layers of convolution operation; and calculating a Euclidean distance based on a pixel-scale for the feature map of the testing image and the feature map of each of the plurality of template images, to serve as a difference value of a difference map;

wherein the difference ratio is associated with a number of a plurality of difference pixels of the difference map and a total pixel quantity of the difference map, wherein the difference value of each of the plurality of difference pixels is greater than a default value.

6. The computer vision-based EMS testing method of claim 1, wherein the testing data is a static testing diagram, and calculating the difference ratio of the testing image to each of the plurality of template images by the processor comprises:

calculating a difference quantity of each pixel according to a background model and the testing image, wherein the background model is associated with the plurality of template images; and determining a difference pixel according to the difference quantity, and generating a difference map and the difference ratio.

7. The computer vision-based EMS testing method of claim 1, wherein generating the plurality of template images at least according to the template video by the processor comprises:

generating the plurality of template images according to the testing data and the template video by the processor.

8. The computer vision-based EMS testing method of claim 1, wherein the testing stage further comprises:

obtaining a configuration of the electronic device by the processor;

searching in a database to obtain a historical threshold of a historical testing record by the processor, wherein the historical testing record has a historical configuration similar to the configuration; and adjusting the threshold according to the historical threshold by the processor.

9. The computer vision-based EMS testing method of claim 1, before calculating the difference ratio of the testing image to each of the plurality of template images by the processor, further comprising:

adjusting a size of the testing image according to a size of each of the plurality of template images.

* * * * *